United States Patent [19]

Kreisner

[11] Patent Number: 4,665,502
[45] Date of Patent: May 12, 1987

[54] RANDOM LOTTERY COMPUTER

[76] Inventor: William Kreisner, 77 St. Marks La., Islip, N.Y. 11751

[21] Appl. No.: 617,118

[22] Filed: Jun. 1, 1984

[51] Int. Cl.[4] .................... G06F 1/04; G06F 3/02; G06F 3/14
[52] U.S. Cl. .................... 364/900; 364/717; 364/412
[58] Field of Search ... 364/200 MS File, 900 MS File, 364/717, 412, 410; 273/138 A, 274

[56] References Cited

U.S. PATENT DOCUMENTS

| | | | |
|---|---|---|---|
| 3,653,026 | 3/1972 | Hurley | 364/717 |
| 4,171,540 | 10/1979 | Arnold | 364/900 |
| 4,348,744 | 9/1982 | White | 364/900 |
| 4,355,361 | 10/1982 | Riggs et al. | 364/900 |
| 4,355,366 | 10/1982 | Porter | 364/717 |
| 4,494,197 | 1/1985 | Troy | 364/900 |
| 4,527,798 | 7/1985 | Siekierski et al. | 364/717 |
| 4,573,681 | 3/1986 | Okada | 364/717 |

*Primary Examiner*—David Y. Eng
*Attorney, Agent, or Firm*—Michael I. Kroll

[57] ABSTRACT

A lottery computer which can select numbers and/or letters randomly and with and without independence between selections. Random numbers are generated independently by having a number of counters run simultaneously for an arbitrary period of time with each counter running at a different repetition rate. Using a high repetition rate compared to the counter running time guarantees randomness. Using separate counters run by separate clocks guarantees independence between selections. Random numbers in which each random selection excludes all other random selections are generated by using a microprocessor which cycles through a loop which contains a complete set of values. After each random selection the random number chosen is removed from the set of values from which a random choice is to be made. A generalized embodiment allows a user to select the alpha or numeric nature of each selection and to set limits on the range of selection. An applications specific embodiment limits a user to a pre-programmed choice of limit on the range of selection and restriction as to the choice of alphabetic or numeric mode.

14 Claims, 8 Drawing Figures

RANDOM LOTTERY COMPUTER

BACKGROUND OF THE INVENTION

1. Field of the Invention

The present invention relates generally to number and letter generating devices and, more specifically, to electronic computing devices which generate numbers and letters at random with and without independence between each number or letter as it is selected.

2. Description of the Prior Art

There are many situations in which it is desirable to be able to select numbers or letters at random. One major application is in the selection of lottery numbers. Different lotteries require varied selections of numbers and/or letters. At the present state of the art there are no easy-to-use lightweight devices which can perform this function. Lottery selections made simply by "thinking of a number" are hardly random since the chooser's prior experiences and prejudices will interfere with randomness. Many of the organizations which run lotteries still use the process of selecting marked balls from a tumbler to obtain randomness. General purpose computers may be programmed with random number generating algorithms for this purpose, however they are heavy, expensive and this application wastes their computing power.

A number of efforts have been made to provide random number selector systems; however, each has severe shortcomings. R. C. Lawlor, U.S. Pat. No. 3,612,845 provided a computer utilizing random pulse trains. In this circuit, noise signals from a diode and clock pulses from a clock pulse source are fed to input legs of a logic circuit such as an AND gate, causing pulses of various amplitudes to appear in the output of the circuit. Complex threshold circuits are then required to eliminate low level pulses leaving high level random pulses. Only one random output at a time is provided. S. Harrington, et. al., U.S. Pat. No. 4,151,404 provided a random digit generator which samples a random pulse output, displays that output, determines a second random number and adds it to the first and displays it. This system is clearly unsuitable to the present purpose because each output is inherently greater than the previous output and, therefore, while the first output is truly random, each succeeding output is not entirely random. T. Newman, U.S. Pat. No. 4,227,064, provided a lottery generating method and apparatus which requires a user to depress one pushbutton for each numeral to be randomly selected, whereas one button operation is clearly preferable. Also, each number is chosen independently of all previous choices, however, in some lotteries, no number may be selected twice.

SUMMARY OF THE INVENTION

It is therefore a primary object of the present invention to provide a random lottery computer which provides a visual display of any number of random selected numbers or letters.

A further object is to provide a random lottery computer in which each selection is independent of any other selection.

Another object is to provide a random lottery computer in which each selection is made at random from a chosen field of numbers in which any previously selected numbers have been removed A yet further object is to provide a random lottery computer in which the range of numbers selected may be predetermined. For example each number selected may be limited to a random selection of between one and forty-four.

A yet further object is to provide a random lottery computer in which the range of letters selected may be predetermined. For example each letter selected may be limited to a random selection of letters between "A" and "J".

A yet further object is to provide a random lottery computer in which the range of letters and numbers to be selected may be determined by key pad manual data entry.

A yet further object is to provide a random lottery computer in which the range of letters and number to be selected may be determined by inserting a Programmable Read Only Memory (PROM) integrated circuit.

A still further object is to provide a random lottery computer which may be powered by a solar cell which recharges a secondary rechargeable battery.

A still further object is to provide a random lottery computer which may be powered by an A.C. operated power source.

A still further object is to provide a random lottery computer which may be powered by a primary battery only.

A yet still further object is to provide a random lottery computer which may be configured as a general purpose lottery computer or as an application specific lottery computer. For example, an application specific lottery computer could be provided which selects six two-digit numbers ranging from zero to forty-four.

A still further object is to provide a random lottery computer which is lightweight, compact, inexpensive to fabricate and easy to use.

A still further object is to provide a random lottery computer which may be configured as a floor mounted version for installation into bars, lottery parlors, etc.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
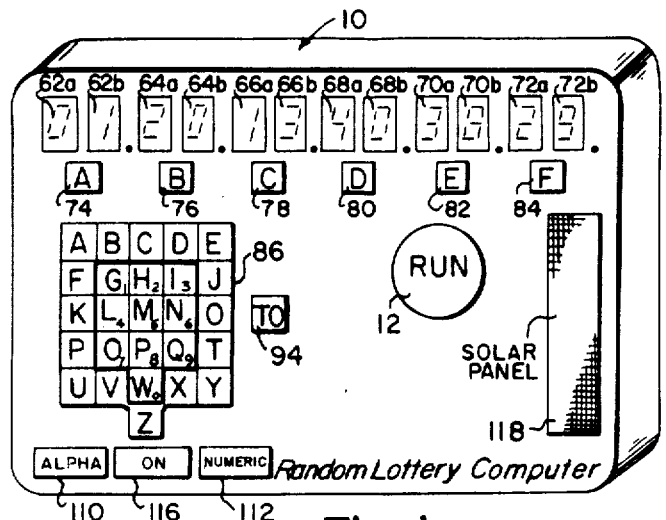
FIG. 1 is a perspective view of the most general form of the invention.
Figure 2:
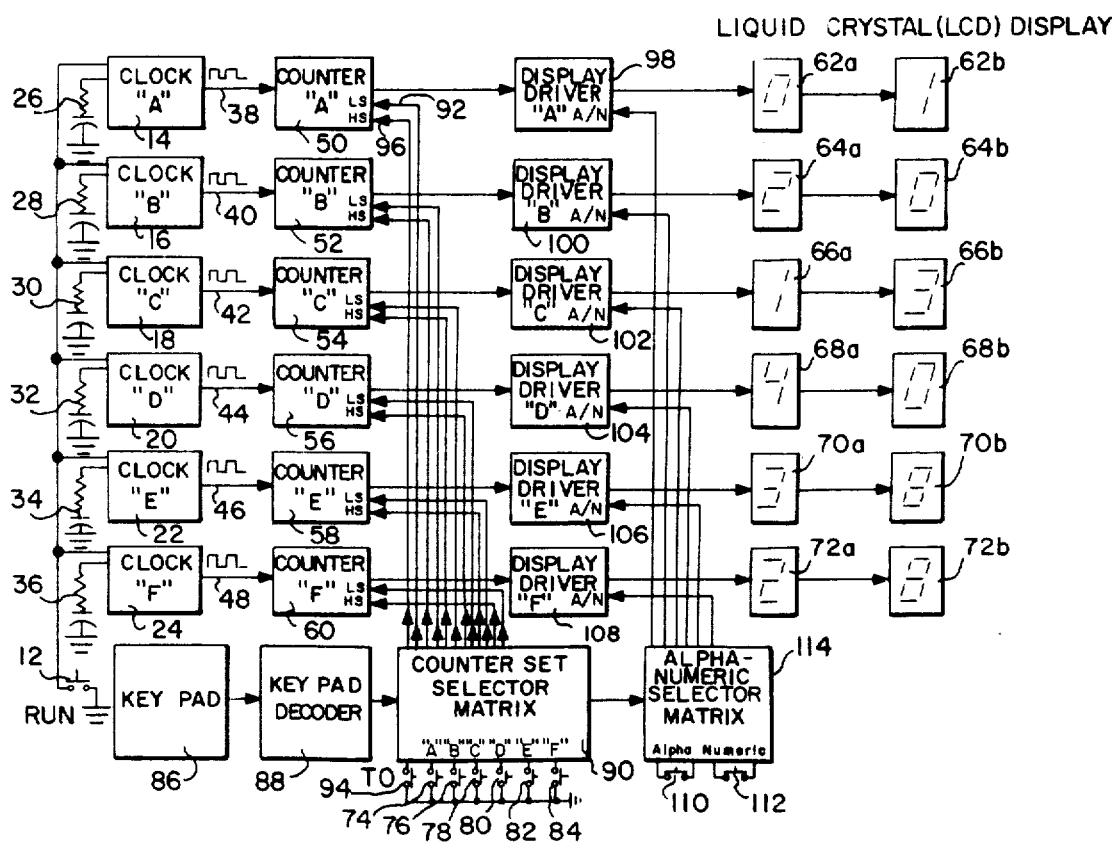
FIG. 2 is an electronic block diagram of the most general form of the invention.

The operation of the most general embodiment of the invention may best be understood with reference to FIGS. 1 and 2. The invention 10 is shown, having already selected six three digit numbers "01-20-13-40-38-29". Before selection may be made, a user must decide the limits of operation. For example, the user may decide to select six random numbers between zero and forty-four. Or, the user may decide to choose different lower or upper limits for each of the six digits. Alternatively, the user may wish to select random letters and limit their range of choice. For the purpose of clarity six pairs of alpha-numeric displays are shown although groupings of one, two or more digits and/or numbers are possible and any number of groupings may be accommodated.

For any of the above cases, the process initiates with depression of "RUN" switch 12 which simultaneously starts clocks "A","B","C","D","E" and "F" which are labelled 14, 16, 18, 20, 22 and 24 respectively which run at different repetition rates determined by the resistance-capacitance (RC) time constants of RC circuits 26, 28, 30, 32, 34 and 36. Since each of the clocks runs at different repetition rates, when "RUN" switch 12 is released each clock will have outputted a different number of square wave pulses onto output lines 38, 40, 42, 44, 46 and 48. If the repetition rate is high the number of pulses outputted by each clock will vary considerably and randomly.

Counters "A","B","C","D","E" and "F" which are labelled 50, 52, 54, 56, 58 and 60 may be up-counters or down-counters whose high set inputs and low set inputs control the initiation and resetting of the counters. For example, if up-counters are used and the low-set is "0" and the high-set is "44" the counter will begin at "0" increase sequentially with each clock pulse to "44" and then reset and resume counting from "0". If down-counters are used and the low-set is "0" and the high set is "44" the counter will begin at "44" decrease sequentially with each clock pulse to "0" and then reset and resume counting down from "44".

Setting the high-set and the low-set is accomplished by first choosing the set of digits to be limited by depressing the switch located under the digit to be limited. Six pairs of alpha-numeric displays 62, 64, 66, 68, 70 and 72 are provided and each of these pairs are provided with selector switches "A","B","C","D","E" and "F" labelled 74, 76, 78, 80, 82 and 84 respectively. For example, if alpha-numeric display 62 is to be limited to select numbers at random from "0" to "44", selector switch 74 is first depressed. The low limit "0" is inputted by depressing the "0" key on keypad 86 twice. These switch closures are detected by key pad decoder 88 whose output is able to set any of the high-sets or low-sets on any of the counters. Depressing selector switch 74 causes counter set selector matrix 90 to direct the decoded signal from key pad decoder 88 to the low-set input 92 of counter 50. The high-set is inputted by depressing the "TO" switch 94 which directs counter set selector matrix 90 to send the next incoming data to the high-set input 96 of counter 50. The high limit "44" is inputted by depressing the "4" key on key pad 86 twice. This process is repeated for the remaining five of the six pairs of digits.

Once all the counters are set, all the counters are run for some arbitrary time by depressing and then releasing run switch 12. The output of each of counters 50, 52, 54, 56, 58 and 60 is in sequential serial form and must be converted to a parallel form by display drivers "A", "B", "C", "D", "E" and "F" labelled 98, 100, 102, 104, 106 and 108 respectively which drive alpha-numeric displays 62, 64, 66, 68, 70 and 72 respectively.

If random letters instead of random numbers are desired the operation is essentially the same with the following changes: The selection of the alphabetic mode or the numeric mode is made by depressing switch 110 or 112 respectively which directs alpha-numeric selector matrix 114 to set the alpha/numeric (A/N) input of the counter chosen via counter set selector matrix 90. Each of the alpha-numeric display pairs may be so chosen thereby permitting a random selection of numbers on some pairs and letters on other number pairs.

Overall power to the invention is applied by depressing "ON" switch 116. A solar panel 118 may be provided to power the invention.

Figure 3:
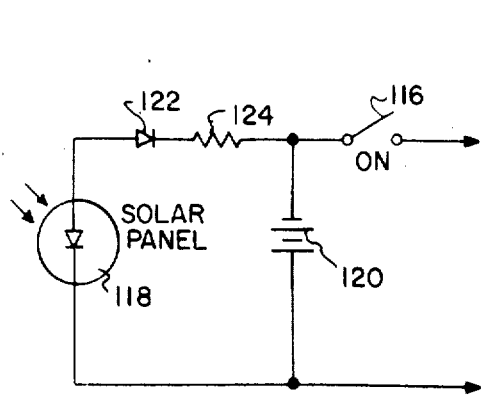
FIG. 3 is an electronic schematic diagram of a solar power supply which may be used to power the invention.

The solar powered method of powering the invention may best be understood with reference to FIG. 3. Light incident upon solar panel 118 charges secondary rechargeable battery 120. Diode 122 prevents battery 120 from discharging through solar panel 118 when there is little or no incident light. Resistor 124 limits the charging rate of the battery 120. "ON" switch 116 turns the invention on and off.

Figure 4:
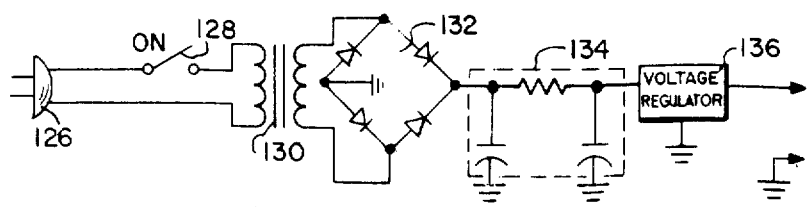
FIG. 4 is an electronic schematic diagram of an A.C. operated power supply which may be used to power the invention.

The A.C. power mains method of powering the invention may best be understood with reference to FIG. 4. A.C. power enters at plug 126, passes through "ON" switch 128, is stepped down by transformer 130, is rectified by full wave bridge rectifier 132, is filtered by pi-filter 134 and is regulated by voltage regulator 136.

Figure 5:
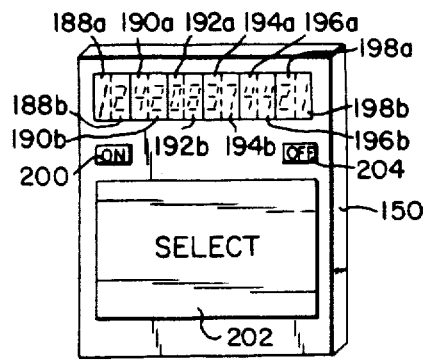
FIG. 5 is a perspective view of one application specific embodiment of the invention.
Figure 6:
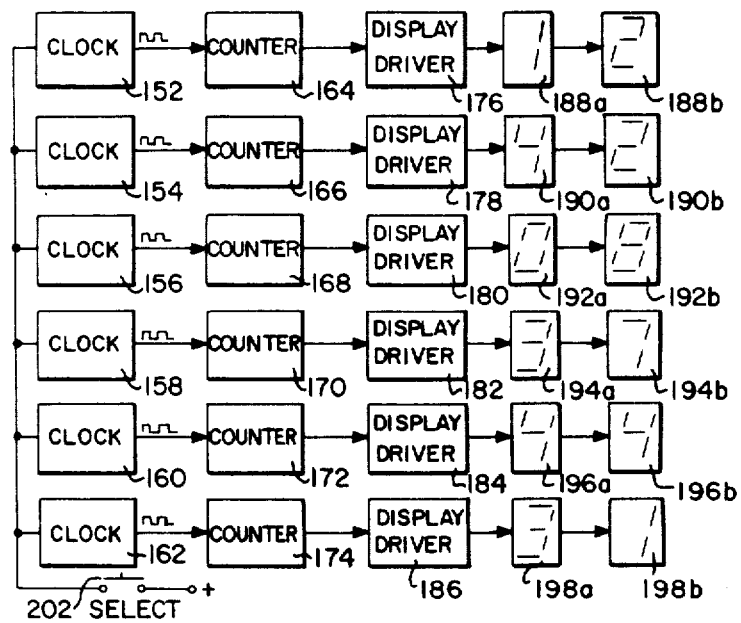
FIG. 6 is an electronic block diagram of one application specific embodiment of the invention shown in FIG. 5.

One application specific embodiment of the invention may best be understood with reference to FIGS. 5 and 6. In this embodiment each pair of digits is randomly selected independently of any previous selection. It is therefore possible to obtain the same random selection more than once. The invention 150 is similar to the more general form in FIGS. 1 and 2 except that the high-set and low-set limits are not user selectable and the output is fixed in its alphabetic or numeric form. This provides an easier to use, less expensive version for use with any particular lottery rule set. Independent random numbers are generated in a manner precisely analogous to the general embodiment by clocks 152, 154, 156, 158, 160 and 162 and their respective counters 164, 166, 168, 170, 172 and 174. In this embodiment, however, the low-set and high-set limits are a hard-wired part of the counters and are not user controllable. It is also possible to provide switches, such as DIP switches to allow switching the limits between different lottery rule sets. The operation of display drivers 176, 178, 180, 182, 184 and 186 and numeric displays 188, 190, 192, 194, 196 and 198 is precisely analogous to the operation of display drivers and displays already described except that the display drivers and displays is the applications specific form are fixed as either alphabetic or numeric only. To operate invention 150 a user merely depresses "ON" button switch 200, depresses "SELECT" button switch 202 for an arbitrary amount of time and then releases "SELECT" button 202. Six two digit numbers, independently and randomly selected will appear in numeric displays 188, 190, 192, 194, 196 and 198. To turn invention 150 off "OFF" button 204 is depressed. Either of the power methods already described and illustrated in FIGS. 3 and 4 may also be utilized with the application specific embodiment.

Figure 7:
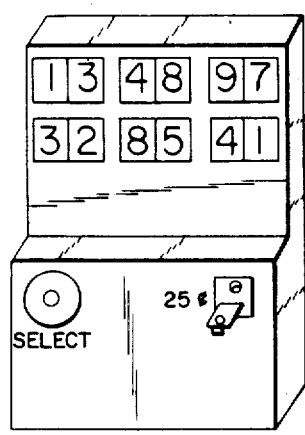
FIG. 7 is a perspective view of another application specific embodiment of the invention shown as a floor mounted model.

A floor mounted version of the invention is illustrated in FIG. 7. The configuration may be either the generalized version or any applications specific version.

Figure 8:
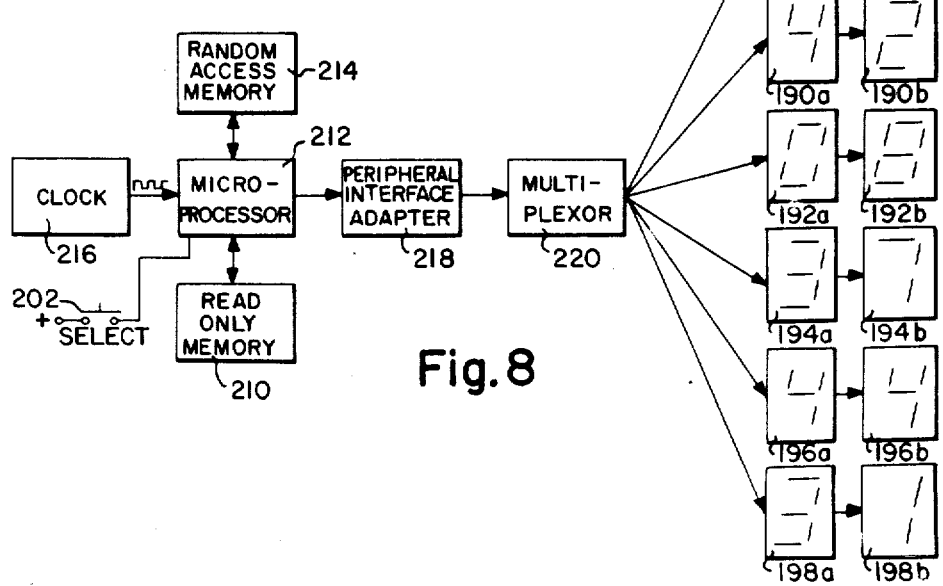
FIG. 8 is an electronic block diagram of another application specific embodiment of the invention shown in FIG. 5.

Another application specific embodiment of the invention may best be understood with reference to FIGS. 5 and 8. In this embodiment each pair of digits is randomly selected, however, the each time a number is so selected, it is removed from the range of possible selections. It is therefore impossible to obtain the same random selection more than once. Read only memory 210 contains "a set of values", for example "1" to "4" from which random selections are to be made. Read only memory (ROM) 210 also contains the instruction set of algorithms for running the lottery computer. When "SELECT" button 202 is depressed, the "set of values" is loaded by microprocessor 212 into random access memory (RAM) 214 and registers on microprocessor 212 are initialized at zero. Microprocessor 212 loops sequentially through the "set of values" at a rate determined by clock 216 until "SELECT" button 202 is released. The value at which looping ceases becomes the first randomly selected value and is stored in a register in microprocessor 212. This randomly chosen value, in binary form, is translated by peripheral interface adapter 218 into a set of voltages necessary to drive the first digital display 188a and 188b. This value remains displayed. Instructions contained in read only memory 210 direct microprocessor 212 to delete the randomly selected "first" value from the "set of values " stored in random access memory 214. Next time the "SELECT" button 202 is depressed, microprocessor 212 again loops through and selects another random value, which is different from the first value. All four remaining values are similarly selected. A multiplexor 220 transmits data sequentially from peripheral interface adapter 218 to each of displays 188, 190, 192, 194, 196 and 198 at a high rate of speed. Since each display is strobed "on" for a short time at a high repetition rate all displays which are ready to receive data appear to be steadily illuminated. Each time "SELECT" button 202 is depressed and released, another pair of digits becomes illuminated until, at last, all six pairs are so illuminated.

Although the above technique has been demonstrated for the application specific embodiment it is understood that the same technique may be used to produce a more generalized form such as that depicted in FIG. 1. Also, the output forms and selections may be easily modified by merely exchanging read only memory 210.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. a random lottery number generating device comprising in combination:

(a) at least two random number generators for generating a random number output, each generator including a free running clock, a resistor-capacitor circuit associated with said clock for generating an RC time constant and a corresponding repetition rate, and a counter, said clock having a clock output which is a train of square waves, said clock output linked to and driving said counter which has a counter output which advances sequentially each time said clock output changes state, whereby the repetition rate of said at least two random number generators is determined by its associated resistor-capacitor RC time constant with the RC time constant of each of said at least two generators being different such that when activation of said clock of each of said at least two generators occurs and continues for an arbitrary time interval, said clock of each generator will output an arbitrary and random number of pulses to said counter to which it is linked, thereby causing said counter of each generator to advance to a different arbitrary count;

(b) means for setting an upper and a lower count limit for said at least two random number generators linked to said counter within each generator; and (c) means for displaying each counter output.

2. A random lottery number generating device, as recited in claim 1, wherein said means for setting an upper and a lower count limit for each of said at least two random number generators comprises said counter whose output advances sequentially each time the output of said clock changes state wherein said counter has a low set input and a high set input which determines the number or alphabetic letter at which said count begins and at which said counter automatically resets and resumes counting; and means for inputting data to said low set input and said high set input.

3. A random lottery number generating device, as recited in claim 2, wherein said means for inputting data to said low set input and said high set input comprises:

an alpha-numeric key pad by which data is manually enterable into said low set input and said high set input;

a key pad decoder which translates closure of keys on said alpha-numeric key pad into a serial sequential low set input signal or a high set input signal;

a counter set selector matrix which directs said low set input signal or said high set input signal to a selected counter; and means for instructing said counter set selector matrix to direct said low set input signal or said high set input signal to a selected counter.

4. A random lottery number generating device, as recited in claim 3, wherein said means for instructing said counter set selector matrix to direct said low set input signal or said high set input signal to a selected counter comprises:

a TO switch which instructs said counter set selector matrix to direct signals from said key pad decoder to either a low set input or a high set input on a selected counter; and at least two selector switches, one for each counter, which directs said counter set selector matrix to direct said signals from said key pad decoder to a selected counter.

5. A random lottery number generating device, as recited in claim 1, wherein said means for displaying the output of said random number generators comprises a display driver for each of said generators wherein said display driver converts a sequential output signal from said counter of each generator into concurrent signals which drive an alpha-numeric electro-optical display.

6. A random lottery number generating device, as recited in claim 5, further comprising means for choosing between alphabetic and numeric output from said random number generators, comprising an alpha-numeric selector matrix whose output directs each of said display drivers to output either an alphabetic letter output or a numeric number output to said alpha-numeric electro-optical display wherein said selection is determined by the setting of an ALPHA switch or a NUMERIC switch.

7. A random lottery number generating device, as recited iin claim 5, wherein said alpha-numeric electro-optical display comprises a liquid crystal display readout.

8. A random lottery number generating device, as recited in claim 5, wherein said alpha-numeric electro-optical display comprises a light emitting diode (LED) readout.

9. A random lottery number generating device, as recited in claim 1, wherein said means for setting an upper and a lower count limit for each of said random number generators comprises said counter whose output advances sequentially each time the output of said clock changes state wherein said counter has fixed wire upper and lower count limits.

10. A random lottery number generating device comprising in combination:
  (a) at least one random number generator for generating a random number output, including a read only memory which contains an entire set of values from which a random selection is made, a microprocessor driven by a clock, and a random access memory, whereby said microprocessor loads said set of values from said read only memory to said random access memory, a select button which initiates looping by said microprocessor of said set of values stored in said random access memory and stops said looping when said select button is released, and at least one register which stores the randomly selected value when said looping ceases;
  (b) means for displaying the output of said at least one random number generator, connected to said generator; and
  (c) means for excluding any previously selected random number from consideration when randomly selecting subsequent numbers, associated with said read only memory and microprocessor.

11. A random lottery number generating device, as recited in claim 10, wherein said means for displaying the output of said at least one random number generator comprises a peripheral interface adapter for translating said random number output from said random number generator, which is in binary form, into a set of voltages and a multiplexor connected to receive said set of voltages from said adapter for sequentially strobing said means for display in order to create the appearance of a steady display and wherein said means for display is an alpha-numeric electro-optical display.

12. A random lottery number generating device, as recited in claim 10, wherein said alpha-numeric electro-optical display comprises at least one liquid crystal display (LCD) readout.

13. A random lottery number generating device, as recited in claim 10, wherein said alpha-numeric electro-optical display comprises at least one light emitting diode (LED) readout.

14. A random lottery number generating device, as recited in claim 10, wherein said means for excluding any previously selected random number from consideration when randomly selecting subsequent numbers comprises means within said microprocessor for removing said previously selected random number from said set of values contained in said random access memory each time a new random selection is initiated.

* * * * *